United States Patent
Alman et al.

(10) Patent No.: US 8,805,320 B2
(45) Date of Patent: Aug. 12, 2014

(54) METHOD AND SYSTEM FOR MESSAGE COLLISION AVOIDANCE

(71) Applicant: AT&T Intellectual Property I, LP, Atlanta, GA (US)

(72) Inventors: Douglas Alman, San Marcos, CA (US); Charles D. Turner, Jr., San Diego, CA (US); Brian Wilson, Johnston, IA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 13/687,283

(22) Filed: Nov. 28, 2012

(65) Prior Publication Data

US 2014/0148116 A1  May 29, 2014

(51) Int. Cl.
*H04M 11/04*  (2006.01)
*H04W 4/22*  (2009.01)
*H04W 4/02*  (2009.01)
*H04W 92/02*  (2009.01)

(52) U.S. Cl.
CPC . *H04W 4/22* (2013.01); *H04W 4/02* (2013.01); *H04W 92/02* (2013.01)
USPC .................. 455/404.1; 455/414.1; 455/414.4; 455/432.2

(58) Field of Classification Search
None
See application file for complete search history.

(56) References Cited

U.S. PATENT DOCUMENTS

| | | |
|---|---|---|
| 6,323,767 B1 | 11/2001 | Gropper |
| 8,250,598 B2 | 8/2012 | Velazquez |
| 2006/0160522 A1* | 7/2006 | Jennings .................... 455/404.1 |
| 2009/0010403 A1* | 1/2009 | Jorgensen et al. ......... 379/88.23 |
| 2010/0138858 A1 | 6/2010 | Velazquez |

OTHER PUBLICATIONS

"Sage ENDEC Manual, Rev. 1.5," retrieved online Mar. 6, 2014 using internet at http://www.lightnerelectronics.com/downloads/SAGEENDECMANUAL.pdf.

* cited by examiner

*Primary Examiner* — Suhail Khan
(74) *Attorney, Agent, or Firm* — Guntin & Gust, PLC; Ralph Trementozzi (57) ABSTRACT

A system that incorporates the subject disclosure may include, for example, receiving first and second audio input signals from first and second communication sources. First and second emergency alert system messages are respectively identified from each of the first and second audio input signals. A temporal overlap is detected between a portion of the first emergency alert system message and the second emergency alert system message. In response to detection of the temporal overlap, a relative delay is applied between the first and second audio output signals. First and second audio output signals are generated including the first and second messages adjusted by the relative delay, such that the first and second emergency alert system messages in the first and second audio output signals are non-overlapping. Other embodiments are disclosed.

20 Claims, 7 Drawing Sheets

METHOD AND SYSTEM FOR MESSAGE COLLISION AVOIDANCE

FIELD OF THE DISCLOSURE

The subject disclosure relates to generally to methods and systems for message collision avoidance.

BACKGROUND

The emergency alert system is a national warning system that requires broadcasters, cable television systems, and radio and satellite service providers to allow the President of the United States and other authorized officials to transmit an emergency message to the public during disasters or crises. State and local authorities may also use the system to deliver emergency information, such as AMBER Alerts and severe weather information, generally targeted to a specific area.

The Federal Communications Commission (FCC), the National Weather Service, and local authorities send emergency alert system messages to broadcast service providers who, in turn, broadcast these messages to the public, for example, to television subscribers. The emergency alert system messages also include regular tests of the emergency alert system, as well as messages that warn of dangerous conditions such as thunderstorms, floods, tornadoes, hurricanes, and earthquakes, or urgent bulletins.

Because many multimedia delivery systems are very large, emergency alert system messages could be disruptive to communities that are not affected by a particular alert. For example, a National Weather Service message directed to coastal regions would be unnecessary for inland regions. A technique referred to as Federal Information Processing Standards (FIPS) filtering, allows a digital network control system to filter and send emergency alert system messages to only targeted states, counties, or subdivisions, as might be identified from a FIPS code provided within each message.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments of systems, methods and computer-readable storage media configured to avoid collisions of emergency alert system messages. Other embodiments are included in the subject disclosure.

One embodiment of the subject disclosure includes a process including receiving, by a system including a processor, a first audio input signal from a first communication source and a second audio input signal from a second communication source. A first emergency alert system message is identified by the system from the first audio input signal, and a second emergency alert system message is identified by the system from the second audio input signal. A temporal overlap of a portion of the first emergency alert system message of the first audio input signal and the second emergency alert system message of the second audio input signal is detected by the system. A first audio output signal including the first emergency alert system message and a second audio output signal including the second emergency alert system message are generated by the system. A relative delay between the first audio output signal and the second audio output signal is applied by the system in response to the temporal overlap, such that the first emergency alert system message in the first audio output signal and the second emergency alert system message in the second audio output signal are non-overlapping.

Another embodiment of the subject disclosure includes a device having a memory to store computer instructions and a processor coupled to the memory. The processor, responsive to executing the computer instructions, performs operations including receiving a first audio input signal from a first communication source and a second audio input signal from a second communication source. A first emergency alert system message is identified from the first audio input signal and a second emergency alert system message is identified from the second audio input signal. A temporal overlap of a portion of the first emergency alert system message and the second emergency alert system message is detected between the first audio input signal and the second audio input signal. A first audio output signal is generated including the first emergency alert system message and a second audio output signal is generated including the second emergency alert system message. In response to detection of the temporal overlap, a relative delay is applied between the first audio output signal and the second audio output signal.

Yet another embodiment of the subject disclosure includes a computer-readable storage medium. The computer-readable storage medium includes computer instructions which, responsive to being executed by a processor, cause the processor to perform operations including receiving a first audio input signal from a first communication source and a second audio input signal from a second communication source. A first emergency message is identified from the first audio input signal and a second emergency message is identified from the second audio input signal. A temporal overlap of a portion of the first emergency message and the second emergency message is detected between the first audio input signal and the second audio input signal. A first audio output signal including the first emergency message and a second audio output signal including the second emergency message are forwarded to an encoder and decoder to process each of the first emergency message and the second emergency message. A relative delay is applied between the first audio output signal and the second audio output signal, in response to the temporal overlap, to eliminate the temporal overlap between the first emergency message and the second emergency message.

Large communication networks, such as used in the delivery of internet protocol television services, might serve more than one geographic region as might be identified by a respective FIPS code. The provider of internet protocol television services may monitor, according to federal, state and local guidelines, emergency alert system messages for each of the regions served by the network. Thus, a monitored emergency alert system source within a first region may receive a first emergency alert system message for the first region having a first FIPS code. The first emergency alert system message might alert the public of an existing or imminent tornado within the first region. Processing of the emergency alert system messages by the network service provider can include some form of FIPS filtering, for example, to prevent a second region served by the network from receiving the alert directed to the first region.

Under certain situations, the second region may receive a second emergency alert system message for the second region having a second FIPS code. For example, the second emergency alert system message might include an AMBER Alert related to the reporting of a child abduction within the second region. To the extent that the network service provider includes separate emergency alert system processing equipment, the signals can be received and broadcast or otherwise distributed independently. It is more common, however, for such network service providers to consolidate equipment, for example, using at least some common equipment for processing emergency alert system messages directed to each of the first and second regions of the illustrative example. For example, an emergency alert system encoder and decoder ("endec") may be used for processing emergency alert system messages. As this device is relatively expensive, it would be beneficial for the network service provider to use a single endec to serve multiple emergency alert system regions.

Figure 1:
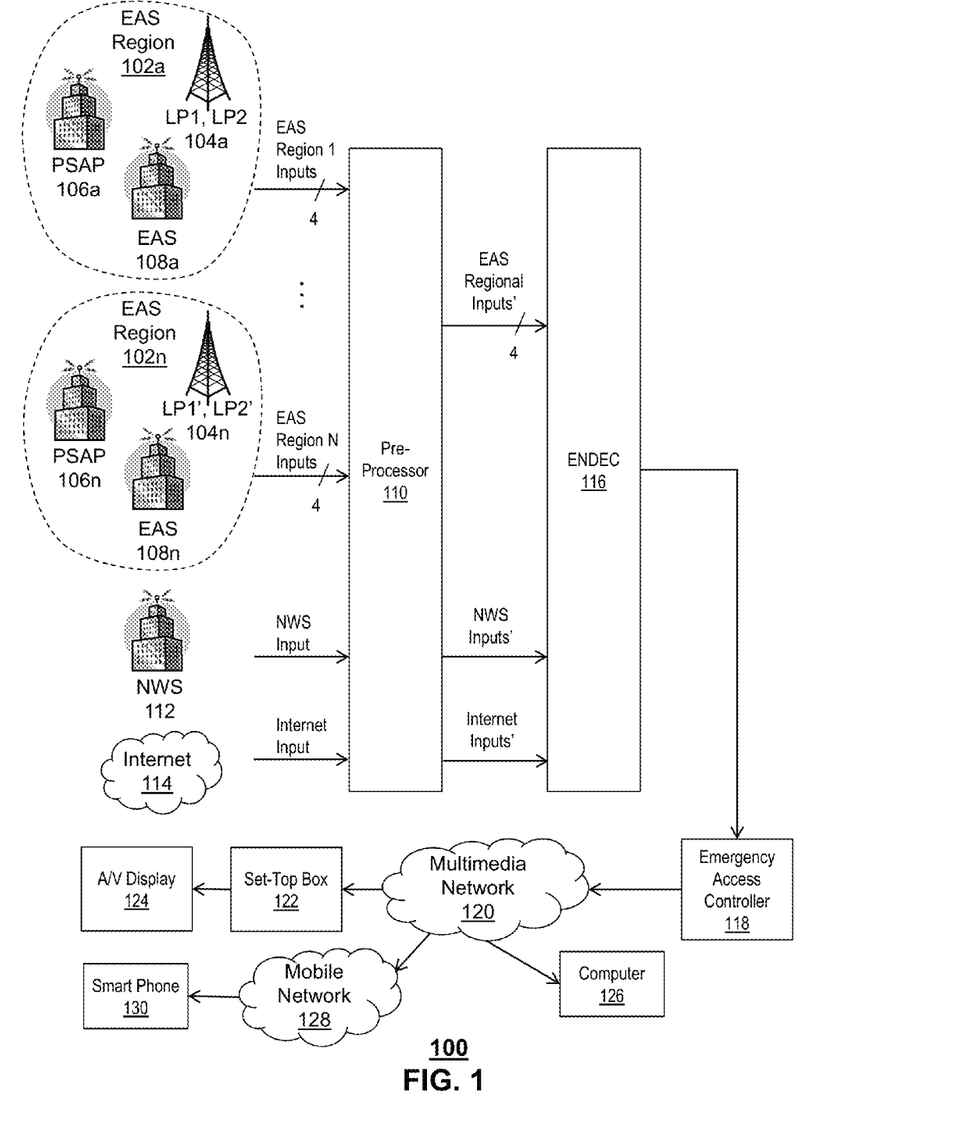
FIG. 1 depicts an illustrative embodiment of an emergency alert system message processing and distribution system.

FIG. 1 depicts an illustrative embodiment of a message processing and distribution system 100 to disseminate emergency alert system messages electronically across one or more geographic regions. A first emergency alert system region 102a represents a particular county or region of a state or province within a country. Such a particular geographic region can be identified by a representative FIPS code. Generally, there are one or more sources of emergency alert system messages for the first region 102a. Example sources include two local emergency alert system primary sources designated as LP1 and LP2, collectively 104a. Other sources can include one or more public service access points 106a and one or more other emergency alert services 108a. In the illustrative embodiment up to four input signals from one or more of the two local primary sources 104a, the emergency alert system primary services access point 106a and the emergency access service 108a are input to a pre-processor 110.

A second emergency alert system region 102b represents another distinct geographic region identified by a respective representative FIPS code. In the illustrative example, the second region 102b also include two local primary sources designated as LP1' and LP2', collectively 104b, a public service access point 106b and an emergency alert services 108b, resulting in four additional input signals to the pre-processor 110. Still other inputs to the pre-processor 110 are obtained from the National Weather Service 112 and the Internet 114.

The system 100 also includes a single emergency alert system endec 116, such as the Sage ENDEC 1822 EAS unit, commercially available from Harris Corp. of Melbourne, Fla. The endec 116 includes multiple inputs, one for each source.

In some instances the number of analog audio inputs of a particular endec 116 is limited. For example, the Sage ENDEC 1822 EAS unit includes six analog audio inputs for emergency alert system monitoring. It is apparent that a single six channel endec 116 would not be able to accommodate all ten analog audio inputs necessary for monitoring both regions 102a, 102b, the National Weather Service 112 and the Internet 114 of the illustrative example. Even if the endec 116 were configured with a sufficient number of audio inputs, there is a possibility of interference resulting from more than one emergency alert system message arriving at the endec 116 at one time.

Figure 2A:
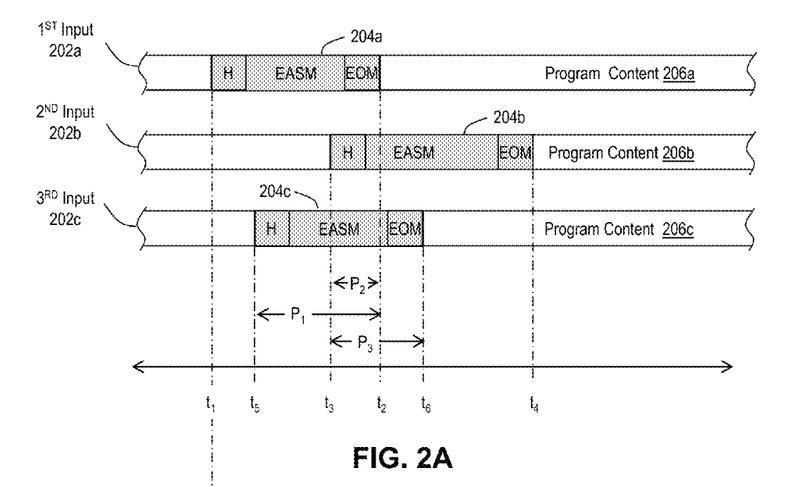
FIG. 2A depicts an illustrative embodiment of a collision of emergency alert system messages.

As emergency alert system messages generally occur infrequently, the possibility of collisions between messages should be relatively low. However, due to the importance of such messages and other requirements imposed upon broadcasters and network service providers for the prompt and accurate dissemination of such messages, the possibility of interference or collision of messages should be avoided. An example of a collision of emergency alert system messages is illustrated in FIG. 2A. A portion of a first audio input signal 202a received from a monitored first emergency alert system source, such as a first primary source LP1 is illustrated. The portion of the first audio input signal 202a includes a first emergency alert system message 204a, which includes a respective header portion H and a respective end-of-message portion EOM defining beginning and end of the first message 204a. Technical features of the emergency alert system messages, including technical features of the header H and end-of-message EOM portions are generally prescribed for the emergency alert system.

Similarly, portions of a second audio input signal 202b, such as a second primary source LP2 and a third audio input signal 202c, such as another monitored broadcast station are shown in temporal alignment with the first audio input signal 202a. For the sake of illustration, each of the portions of the second and third audio input signals 202b, 202c also includes a respective emergency alert system message 204b, 204c. Once again, each of the second and third emergency alert system messages 204b, 204c includes a respective header H and end-of-message EOM. To assist with illustration of message collisions, a timeline is provided below the three portions of audio input signals 202a, 202b, 202c. Times $t_1$ and $t_2$ respectively identify the beginning and end times of the first emergency alert system message 204a. Likewise, times $t_3$ and $t_4$ respectively identify the beginning and end times of the second emergency alert system message 204b, and times $t_5$ and $t_6$ respectively identify the beginning and end times of the third emergency alert system message 204c.

A first period $P_1$ is illustrated as extending between times $t_5$ and $t_2$ of the timeline. The first period $P_1$ identifies a temporal overlap of a portion of the first emergency alert system message 204a and a portion of the third emergency alert system message 204c, e.g., representing a collision of the first and third emergency alert system messages 204a, 204c. A second period $P_2$ is illustrated as extending between times $t_3$ and $t_2$ of the timeline. The second period $P_2$ identifies a temporal overlap of a portion of the first emergency alert system message 204a and the second emergency alert system message 204b, e.g., representing a collision of the second and third emergency alert system messages 204b, 204c. Likewise, a third period $P_3$ is also illustrated as extending between times $t_3$ and $t_6$ of the timeline. The third period $P_2$ identifies a temporal overlap of a portion of the second emergency alert system message 204b and the third emergency alert system message 204c, e.g., representing a collision of the first and second emergency alert system messages 204a, 204b.

To the extent that a common message processing unit is used, such as a single endec 116 (FIG. 1), to process two or more of the first, second and third emergency alert system messages 204 of the illustrative example, it is apparent that a message collisions will result according to temporally overlapping regions $P_1$, $P_2$, $P_3$. Namely, as the endec 116 processes one of the messages, e.g., the first emergency alert system message 204*a*, another message, such as the second emergency alert system message 204*b*, is received. Depending upon a particular implementation, the endec 116 may continue to process the first message 204*a*, and essentially disregarding the second message 204*b*. Alternatively, the endec 116 may terminate processing of the first message 204*a* in favor of the second message 204*b*. It is also conceivable that neither of the first or the second messages 204*a*, 204*b* would be processed accurately due to interference resulting from the temporal overlap of the two messages 204*a*, 204*b* during period $P_2$.

Figure 3:
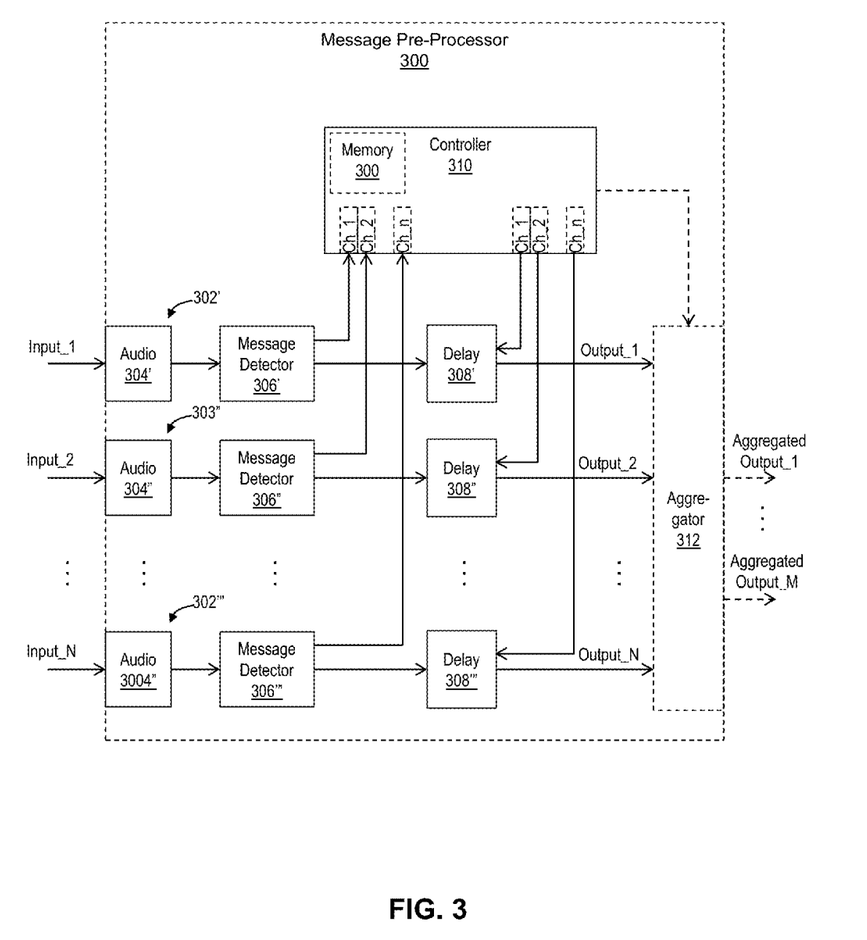
FIG. 3 depicts an illustrative embodiment of a message pre-processor that can be utilized in the emergency alert system message processing and distribution system of FIG. 1 and within elements of the communication systems of FIGS. 5 and 6.

FIG. 3 depicts an illustrative embodiment of an emergency alert service message pre-processor 300 that can be utilized, for example, in the emergency alert system message processing and distribution system 100 (FIG. 1). The message pre-processor 300 includes a number of audio processing channels 302', 302", 302''' (generally 302). Each audio processing channel 302 includes a respective audio channel circuit 304', 304", 304''' (generally 304), a message detector 306', 306", 306''' (generally 306) and a delay device 308', 308", 308''' (generally 308).

The audio circuit 304 receives an input signal from an external emergency alert system messaging source, such as the primary designated sources LP1, LP2. The audio circuit 304 can include a connector adapted for connection to the message pre-processor 300 by the external source. In some embodiments, the audio circuit 304 includes an audio connector for receiving an audio signal from an external audio signal source. In some embodiments, the audio circuit 304 includes additional elements, such as audio processing elements including one or more of signal conditioners, such as amplifiers, attenuators and filters.

In some applications, the message pre-processor 300 can receive signals bearing audio information, but not necessarily in an electrical audio format. Such signals can include radio frequency signals, for example, from an antenna or radio receiver, digital signals, for example from a computer and/or network element, and optical signals, for example, from an optical signal source by way of a fiber-optical cable. The audio circuit 304 can include one or more circuit elements, such as combinations of one or more of those discussed below alone or in addition to other audio processing elements disclosed herein.

By way of illustrative example, the audio circuit 304 can include transformative circuits adapted to obtain or otherwise extract audio signal from non-audio signals received from external sources. Examples of transformative circuits include radio receivers adapted to receive a radio signal, for example from an antenna or radio frequency receiver, and provide one or more of frequency translation (up-conversion and/or down-conversion), RF filtering and/or amplification, and audio signal detection. In other embodiments, the audio circuit 304 includes digital circuits alone or in combination with one or more of the other audio circuits disclosed herein. Digital circuits, for example, can be adapted to receive a signal providing digital data indicative of an audio signal. Such digital circuits can include one or more of digital signal processors, digital-to-analog and analog-to-digital converters. It is conceivable that the audio circuit 304 can also include optical and/or electro-optical components as would be advantageous in receiving an optical input signal and converting it to an electrical audio signal for further processing by the audio processing channel.

The audio circuit 304 provides an audio signal output obtained from the received signal and provided as an input to the message detector 306. The message detector 306 obtains at least some identifying information from an emergency alert system message provided by way of the audio signal. It is understood that the audio signal can include content other than emergency alert system messages. Such content is referred to herein as program content 206*a*, 206*b*, 206*c* (generally 206) (FIG. 2). Program content 206 can include, for example, regularly scheduled broadcast programs, such as radio and/or television shows, digital media streams, and the like.

Each emergency alert system message 204 includes a header portion H and an end-of-message EOM portion. The message detector 306, for example, can be configured to detect or otherwise obtain information content one or more of the header H and the end-of-message EOM. At least some information of an emergency alert system message 204 is provided in an audio phase shift keying (APSK) modulated format. This allows for the passage of digital information within an audio bandwidth suitable for processing by audio signal processing equipment. In at least some embodiments, the message detector includes an APSK signal interpreter to obtain digital information from APSK encoded portions of an emergency alert system message 204. In some embodiments, digital information obtained by the message detector 306 is forwarded by way of a first output to a controller 310.

The message detector 306 includes a second output by which the audio signal is provided to an input of the delay device 308. The delay device 308 can apply a delay to the audio signal ranging from zero to some number of time increments, as may be measured in seconds and/or minutes. The delay device 308 includes an output providing a delayed version of the audio signal received from the message detector 306. In at least some embodiments, each of the delay devices 308 is in further communication with the controller 310. For example, each of the delay devices 308 can receive instructions from the controller 310.

Each delay device 308 can be configured to provide a fixed delay or a variable delay to the audio signal according to a delay instruction received from the controller 308. In some embodiments, the delay can be a single fixed delay that might be switched in or out (on or off). The duration of the delay can be chosen or otherwise set to be greater than a length of an expected emergency alert system message. For example, the duration of the delay can be set to be greater than an average emergency alert system message length (e.g., 30 seconds, or 1 minute). Alternatively, the duration of the delay can be set to be greater than a message duration associated with a probability that any message exceeding that message duration is less than some value, such as 10%, 5%, 1%. In some embodiments, the delay can be selectable from among multiple fixed delay values, or substantially continuously between a minimum (e.g., 0 seconds) and maximum delay values (e.g., 30 seconds, 1 minute, 2 minutes).

The delay device 308 can include one or more of analog and digital delay devices. Examples of analog delays include analog delays, such as a magnetic tape loop delay and analog circuit delays, such as bucket-brigade devices or charged-coupled devices. Examples of digital delays include data or signal buffers. Such buffers can be configured to sample or otherwise store a streaming portion of the audio signal, providing as an output a delayed version of the received audio signal. The extent of the portion of the audio signal buffered in this manner can control a delay measured between the input and output signals of the delay device 308. The duration of the delay can be controlled, e.g., by the controller 310, by adjusting the size of the stored portion of the signal, sometimes referred to as a buffer depth. Any suitable physical storage medium can be used, such as random access memory, flash memory, hard disk drives, optical disks and the like. The buffer can be implemented as a data buffer in software, pointing at a location in a physical memory. It is understood that the delay device 308 can include analog-to-digital converter converting a received analog signal into a digital form adapted for storing in a data buffer. In at least some embodiments, the delay device 308 can include a digital-to-analog converter to convert a buffered digitized version of the analog signal back into an analog signal.

In operation, an audio signal received through the audio circuit 304 is monitored by the message detector 306 for the occurrence of any emergency alert system messages. Upon detection of an emergency alert system on any of the monitored channels 302, the respective message detector 306 provides information to the controller 310 indicative of the detected message. The forwarded information can be as simple as a single bit identifying whether a message has been detected or not. For example, a bit or similar flag can be set (e.g., changed from a 0 to a 1) upon detection of a header H portion of an emergency alert system message 204 in association with a respective one of the audio channels 302. The bit or flag could then be reset (e.g., changed from a 1 to a 0) upon detection or completion of an end-of-message EOM portion of the message 204. By tracking such information bits or flags for each of the audio channels 302, the controller 310 can detect a message overlap when more than one of the channels 302 indicates that a message is being received. This could include combinations of logical circuit elements, such as a logical "and," "or" and "exclusive or" of bits received from the monitored channels. Other forwarded information can include additional information such as a message source, a FIPS code, or some other indication of message priority.

The controller 310, in turn, monitors information received from the message detectors 306. Upon receiving an indication of an emergency alert system message from one or more of the message detectors 306, the controller 310 provides instruction to delay one or more of the delay devices 308. For example, if a message is first received on a first audio channel 302', and a second message is received on a second audio channel 302" before the first message has completed, the controller can instruct one or more of the delay devices 308', 308" associated with each of the first and second audio channels to introduce a relative delay between the channels 302', 302" to avoid the possibility of the delivery of overlapping messages at outputs of the message pre-processor 300.

A relative delay between at least two audio signals can be established by applying a fixed delay to one or more audio signals. For example, a fixed delay of T seconds can be applied to a first one of the audio signals; whereas a zero delay, i.e., no delay, is applied to a second one of the audio signals. A resulting relative delay between the first and second audio signals can be determined by the fixed delay T. Alternatively, a respective fixed delay can be applied to each of the first and second audio signals. For example, a delay of T/2 can be applied to the first audio signal and a delay of 3T/2 can be applied to the second audio signal. A relative delay between the first and second audio signals can be determined as a difference of the respective fixed delays. As in the illustrative example, a relative delay between the first and second audio signals can be determined as $\Delta T = |T/2 - 3T/2| = T$. The relative delay $\Delta T$ can be selected, for example, by the controller 310, such that the relative delay between the first and second audio signals is sufficient to eliminate an occurrence of overlapping messages between these channels.

In at least some embodiments one or more audio delays can be selected to establish an order of occurrence of messages in the first and second output audio channels. For example, a greater delay can be applied to the second audio signal than the first audio signal, such that the first audio signal occurs first in a non-overlapping presentation of the first and second output audio signals. Delay values can be adjusted, as required, to alter the ordering of the output audio signals, for example, causing the second audio signal to occur before the first in a non-overlapping presentation. In at least some embodiments, the controller 310 can be configured to control the application of one or more delays by the delay devices 308 to control an ordering of presentation, in addition to avoiding any overlap or collision of messages.

The controller 310 can determine an ordering of presentation according to any number of considerations, such as one audio input or channel having preference over one or more other channels, certain messages having priority over other messages, for example, according to a message source, content, FIPS code, etc. In some embodiments, the controller 310 can include pre-programmed logic to control the application of delays to one or more audio signals according to more than one such considerations. For example, the controller 310 can apply delays according to a preferred input channel, unless trumped by a priority of a message on a non-preferred channel.

By way of further illustration, a first delay device 308' can include a first buffer to temporarily store, or otherwise buffer a first buffered portion of a first audio signal. Likewise, a second delay device 308" can include a second buffer to temporarily store, or otherwise buffer a second buffered portion of a second audio signal. Each of the first and second delay devices 308', 308" by way of its respective buffer can apply a respective delay to one of the first and second audio signals. The controller 310 can establish a relative delay between the first and second audio signals by instructing the first and second delay devices 308', 308" to apply respective delays to the first and second audio signals. The relative delay can be controlled or otherwise adjusted by adjusting the buffer depth of one or both of the first and second delay devices 308', 308", thereby adjusting the extent of the first buffered portion of the first audio input signal and the extent of the second buffered portion of the second audio input signal.

In some embodiments, the outputs of the delay devices 308 for each of the audio channels 302 are provided as outputs of the message pre-processor 300. For such implementations, the number of audio outputs would be substantially the same as the number of audio inputs, e.g., with a one-to-one mapping between inputs and outputs. An advantage offered by the media pre-processor for such implementations includes temporally adjusting received messages to remove situations in which emergency alert system messages would otherwise overlap. It should be understood that the output signals are generally routed to emergency alert system processing equipment, for example, including an emergency alert system encoder and decoder or endec 116 (FIG. 1).

In some embodiments, the outputs of the delay devices 308 for each of the audio channels 302 are provided to an audio signal aggregator 312. The signal aggregator can aggregate or otherwise combine emergency alert system messages received on a first number N of received audio output channels to a different number M of forwarded audio output signals. The value of M can be pre-established, for example, such that M<N. In some embodiments, a number of input audio channels 302 are processed as disclosed herein and provided to the aggregator 312, which in turn, combines processed messages 204 of one or more of the input audio channels 302 providing the combined results on a lesser number of audio output signals.

By way of illustrative example, signal inputs, e.g., four, from the first emergency alert system region 102a (FIG. 1) can be processed along with signal inputs, e.g., four, from the second emergency alert system region 102b. The aggregator 312 receives all eight processed inputs, but combines the results. For example and without limitation, the combination can include combination of like emergency alert system message sources. Thus signals received from the local primary sources 104a of the first region 102a can be combined with signals received from the local primary sources 104b of the second region 102b. In the illustrative example, a total of eight processed emergency alert system input signals can be combined by the aggregator 312 to four emergency alert system output signals. Such reduction in the number of processed signals can be achieved without concern for the possibility of message collision, thereby reducing the number of signals to be processed by other elements of the system, such as the endec 116. It is conceivable that in some embodiments, any number of input channels can be aggregated to a single or some other small number of channels thereby greatly reducing the cost and complexity of other elements of the system, such as the endec 116 and the emergency access controller 118.

In at least some embodiments, the controller 310 can be configured to identify duplicate emergency alert system messages received from more than one monitored emergency alert system message sources. Such duplications can be accomplished, for example, by comparing features of different messages 204 received by way of the message detectors 306. Overlapping messages 204 on different audio channels 302 having one or more of identical message headers H and message durations determined by a period measured between a message header H and an end-of-message EOM portion can be identified or otherwise marked as duplicate. One of the duplicate messages can be blocked from forwarding by the message pre-processor 300. Such message blocking can be accomplished by the controller 310 in combination with the aggregator 312.

For example, the controller 310 can determine by processing of information from the respective message detectors 306', 306" that a first and second audio channels 302', 302" include overlapping messages that happen to be identical. Upon detection of such conditions, the controller 310 can provide a control signal to the aggregator 312 to effectively drop one of the duplicate messages by only forwarding another one of the duplicate messages. In the illustrative example, a first emergency alert system message received of the first audio channel 302' can be processed and forwarded by the aggregator, while a second, duplicate, emergency alert system message received on the second audio channel 302" is prohibited by the aggregator 312 from being forwarded by the message pre-processor.

It is conceivable that such removal of duplicative messages can be beneficial in situations in which the messages are received in relative close temporal proximity, but without actually overlapping. In at least some embodiments, the controller 310 can be adapted to recognize duplicate messages, for example, within some time limit that can include non-overlapping messages. The controller 310 can thus perform comparisons of emergency alert system messages 102, or portions thereof, received by the message pre-processor 300 for messages received within some time period of each other. Such a time period can be fixed, or settable. Such a comparison can also be conditioned upon other message features, such as message priority. Thus, messages above some priority threshold might be forwarded despite there being a high chance of the messages being duplicative.

In some embodiments, the aggregator 312 can include a multiplexer, such as an audio multiplexer, combining one or more input signals with some fewer number of output signals, e.g., and N×M multiplexor, in which M<N. Alternatively or in addition, the aggregator 312 can include an audio bridge or similar combining circuit to combine one or more processed audio channels 302 into a single processed, aggregated output audio signal.

For embodiments, in which the controller 310 is configured to determine a priority of received emergency alert system messages 204, preference can be offered to messages 204 having a higher priority. For example, a message 204 from the National Weather Service might be configured to have a different priority than a message 204 received from an AMBER Alert source. In processing messages 204 having different delays, a message 204 having a higher priority can be processed or otherwise forwarded before any overlapping message 204 having a lesser priority. In some embodiments, a first-received message 204 having a lower priority can be interrupted or otherwise replace by a later-received overlapping message 204 having a higher priority. The first-received message 240 can be delayed by a respective delay device 308 and sent after conclusion of the higher-priority message 204. At least a portion of one or more of any received emergency alert system messages 204 can be buffered to allow for forwarding after occurrence of a message interrupt, such as preemption by a higher-priority message 204.

It should be understood that any of the processing, including delays, although applied to received signals 202 including program content 206, do not generally interfere with delivery of programmed content 206 to subscribers or the general public. The audio processing disclosed herein is primarily for the purpose of identifying and disseminating emergency alert system messages 204. Messages 204 detected and processed can be interjected or otherwise combined with the dissemination of other multimedia programming including radio, broadcast television, internet, internet protocol television, cable, satellite, mobile cellular and the like.

Figure 2B:
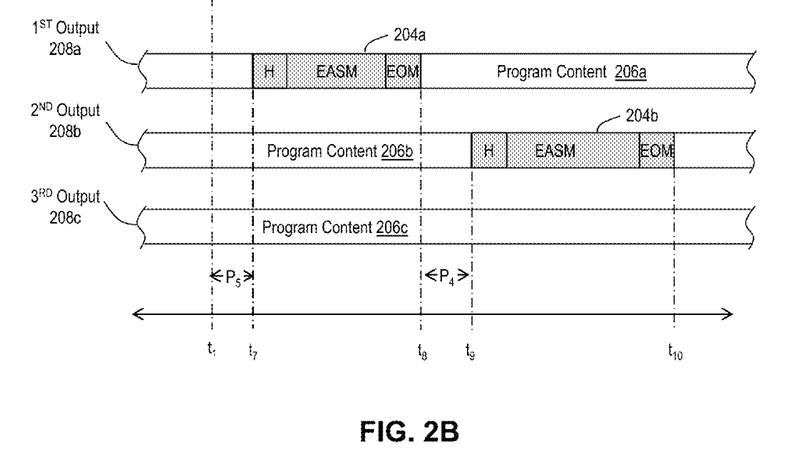
FIG. 2B depicts an illustrative embodiment of the emergency alert system messages depicted in FIG. 2A after having been processed according to portions of the systems and processes disclosed in FIGS. 1 and 3-6.

FIG. 2B depicts an illustrative of the benefits achievable according to processing of the emergency alert system messages of FIG. 2A according to the techniques disclosed herein. By way of illustration, the first emergency alert system message 204a on a first input 202a is forwarded on a first output 208a. In at least some embodiments, the first message 204a is provided with a measurable delay $P_5$ resulting from a minimum processing delay of the message pre-processor 110, 300. It is conceivable that this minimum processing delay $P_5$ could approach zero in at least some instances. The processed second message 204b has been delayed with respect to the processed first message 204a, such that there is a delay $P_4$ between the end of the first processed message 204a at time $t_8$ and a beginning of the second processed message 204b at time $t_9$. This delay ensures that the two messages 204a, 204b can be forwarded for further processing, for example, by a single endec 116, without concern for interference resulting from the message collision indicated by the overlapping message portion $P_2$ depicted in FIG. 2A. In the illustrative example, the third emergency alert system message 204c has been determined to be duplicative of one of the first and second messages 204a, 204b. As such, the pre-processor 300 culls or otherwise prevents or blocks the third message 204c from being forwarded after application of the techniques disclosed herein.

For embodiments able to interpret message priority, the particular ordering of the first and second messages could have been different after application of the relative delay. For example, if the second message 204b had a higher priority than the first message 204a, the second message 204b could have been forwarded first, and a relative delay applied to the first message 2404a, such that the first message 204a is forwarded after conclusion of the second message 204b.

Figure 4:
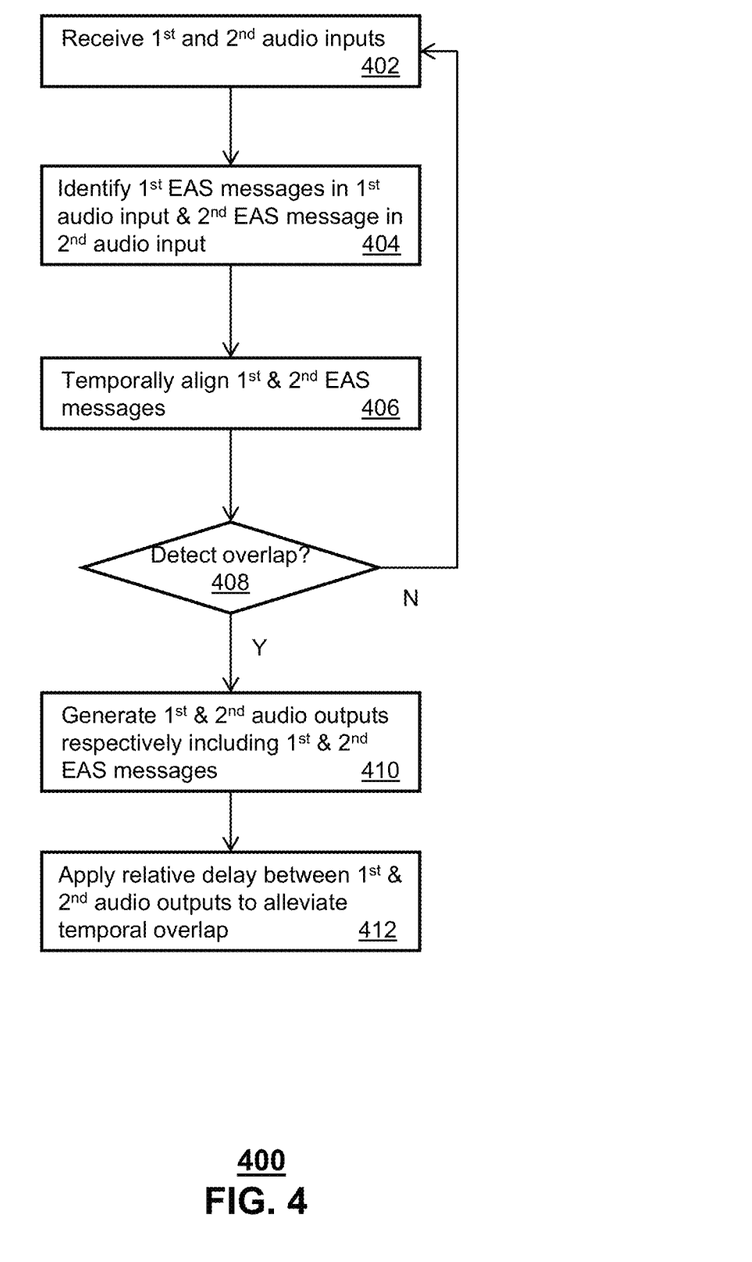
FIG. 4 depicts an illustrative embodiment of a process operating in portions of the system disclosed in FIGS. 1, 3, 5 and 6.

FIG. 4 depicts an illustrative embodiment of a process 400 to alleviate the possibility of collisions of emergency alert system messages 204 (FIG. 2) operating in portions of the various systems 100 (FIG. 1) disclosed herein. A first audio input signal 202a is received from a first communication source and a second audio input signal 202b is received from a second communication source at 402. The first audio input signal 202a can be obtained from any of the various input signal sources illustrated in FIG. 1, such as the designated primary sources 104a, 104b of the first or second emergency alert system regions 102a, 102b and other emergency alert system sources 108a, 108b of the first or second emergency alert system regions 102a, 102b. The first and second audio input signals 202 can be received, for example, at respective inputs of a message pre-processor 110, 300.

A first emergency alert system message 204a is identified from the first audio input signal 202a and a second emergency alert system message 204b is identified from the second audio input signal 202b at 404. Identification of an emergency alert system messages 204 can be accomplished, for example, by the message detectors 306 of the message pre-processor 300, according to the various techniques disclosed herein alone or in combination with techniques otherwise generally known by those skilled in the art. For APSK encoded message headers, the message detector 306 can include an APSK decoder to determine at least some information content encoded within each of the first and second emergency alert system messages 102. Such identification can range from simply characterizing the start and/or end of an emergency alert system message 204, to interpreting some or all of the information content encoded within such messages 204.

The first and second emergency alert system messages 204a, 204b are temporally aligned at 406. Such alignment, as illustrated in FIG. 2A facilitates detection of overlap of any portion of the first emergency alert system message 204a of the first audio input signal 202a and the second emergency alert system message 204b of the second audio input signal 202b. The occurrence of any such overlap between the first and second emergency alert system messages 204a, 204b, as indicated by $P_2$ of the illustrative example, is detected at 408. Detection can be accomplished by the controller 310 of the message pre-processor 300 detecting the start of the second message 204b before a conclusion of the first message 204a. If overlap between messages is not detected, the process continues at 402, with respect to subsequently received messages.

In response to the temporal overlap $P_2$ at 408, a first audio output signal including the first emergency alert system message 204a and a second audio output signal including the second emergency alert system message 240b are generated at 410. A relative delay between the first audio output signal and the second audio output signal applying is also applied 412 in response to detection of the temporal overlap at 408. In an illustrative example, the delay results in a temporal separation of $P_4$, between an end of the first message 204a and a beginning of the second message 204b. The value of the delay provided can be estimated by the quantity $P_2+P_4$, or by the quantity: $(t_2-t_1)+(t_9-t_8)$. Preferably, application of the relative delay results in the first emergency alert system message in the first audio output signal no longer overlapping the second emergency alert system message in the second audio output signal.

Figure 5:
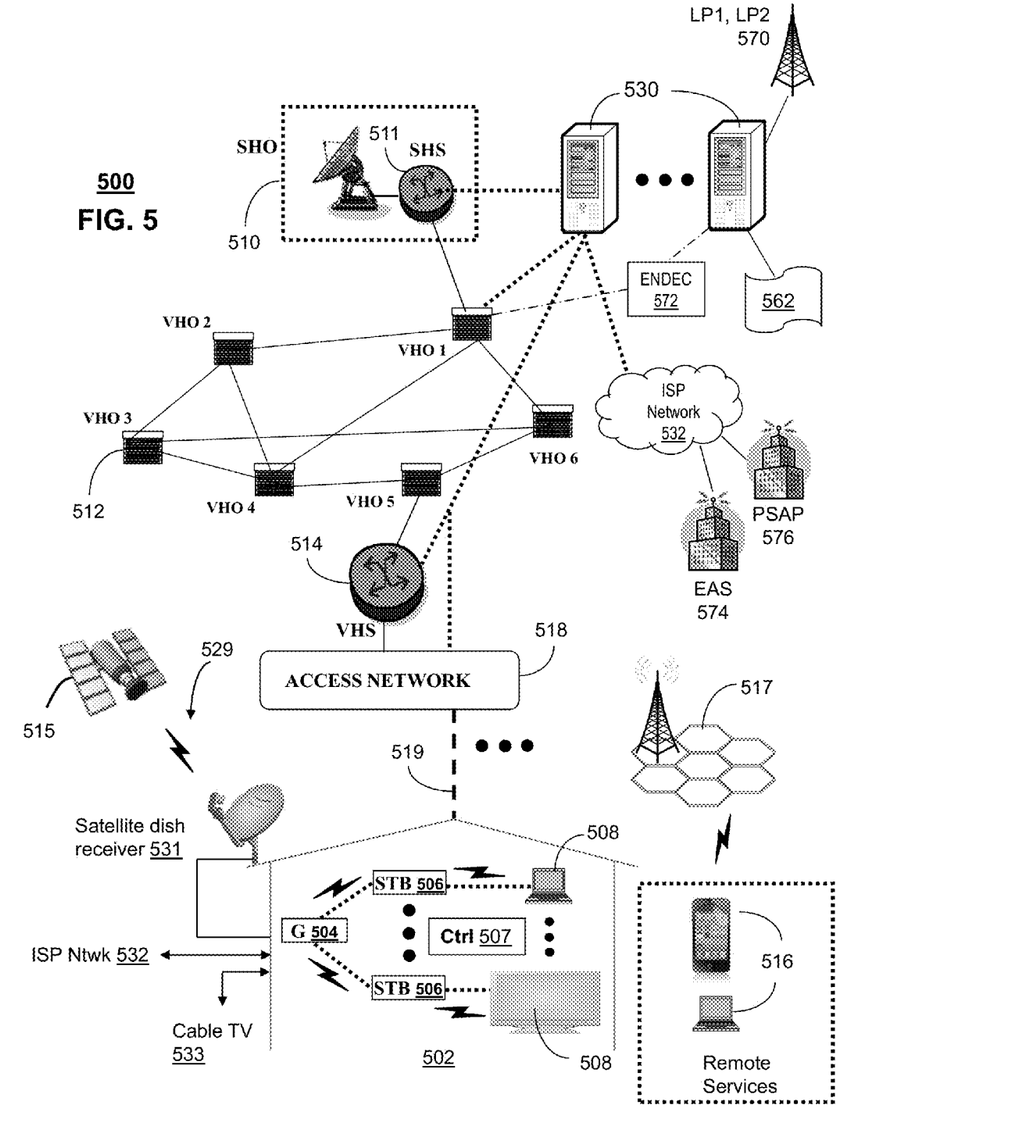
FIGS. 5-6 depict illustrative embodiments of communication systems that provide media services including provisions for processing and distribution of emergency alert system messages as disclosed herein.

FIG. 5 depicts an illustrative embodiment of a first communication system 500 for delivering media content. The communication system 500 can represent an Internet Protocol Television (IPTV) media system. Communication system 500 can be overlaid or operably coupled with the communication system 100 of FIG. 1 as another representative embodiment of communication system 500. In some embodiments, the system 500 is configured to respectively receive first and second audio input signals from first and second communication sources. The system 500 can respectively detect first and second emergency alert system messages from the first audio and a second audio input signals. The system 500 can further detect temporal overlap of a portion of the first and second emergency alert system messages, generate first and second audio output signals respectively including the first and second emergency alert system messages and introduce a relative delay between the first and second audio output signals such that the first and second emergency alert system messages no longer overlap.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a message pre-processor (herein referred to as pre-processor 530). The pre-processor 530 can use computing and communication technology to perform function 562, which can include among other things, detection and resolution of overlap or collision of emergency alert system messages. In the illustrative embodiment, the pre-processor receives audio input signals from other sources, such as LP1 and LP2 570, or the emergency alert service 574 and/or the primary service access point 576, each by way of an internet service provider network 532. The pre-processor 530 provides processed audio output signals to other processing equipment, such as an endec 572 and an emergency access controller (not shown). In the illustrative example, the endec 572 is coupled to one of the video headend offices VHO1. The video headend office VHO1 thus serves as an entry point for interjecting processed emergency alert system messages received from the endec 572 to subscribers of the communication system 500, for example, by way of their media device 508, computer 508, mobile computer and/or mobile phone 516.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
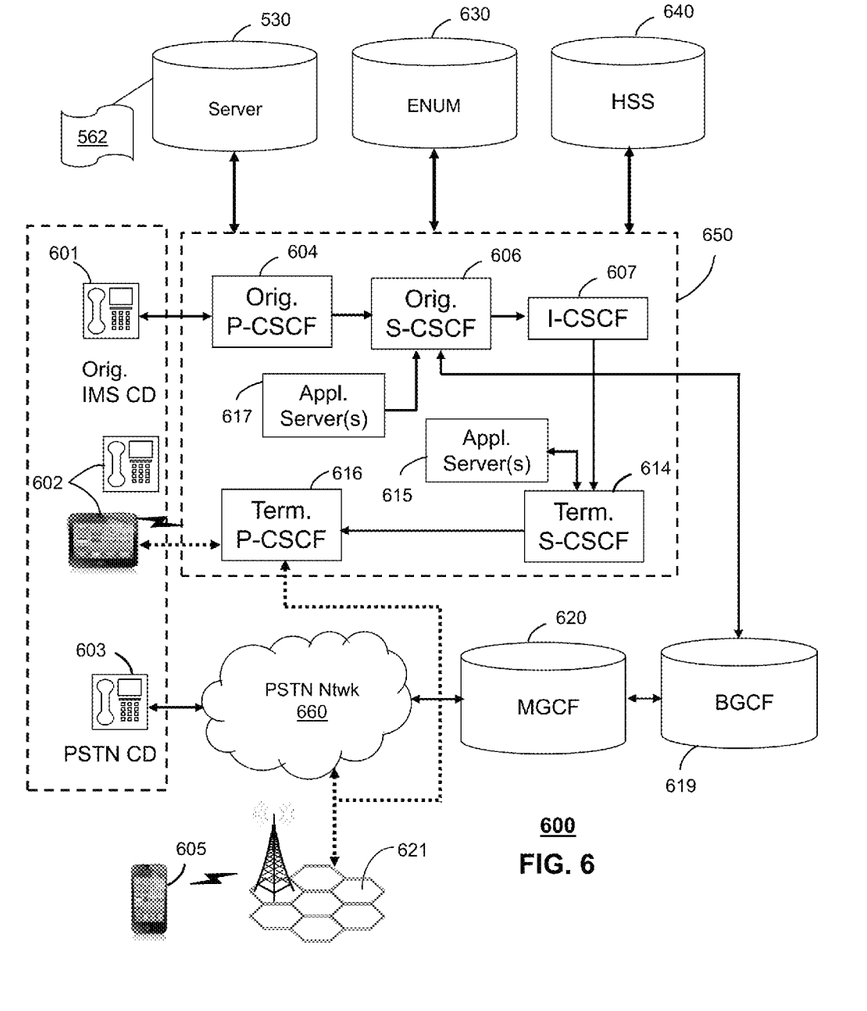

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with the communication system 100 of FIG. 1 and the communication system 500 of FIG. 5, as another representative embodiment of the communication system 500. In some embodiments, the system 600 is configured to respectively receive first and second audio input signals from first and second communication sources. The system 600 can respectively detect first and second emergency alert system messages from the first audio and a second audio input signals. The system 600 can further detect temporal overlap of a portion of the first and second emergency alert system messages, generate first and second audio output signals respectively including the first and second emergency alert system messages and introduce a relative delay between the first and second audio output signals such that the first and second emergency alert system messages no longer overlap.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 500 of FIG. 5.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The pre-processor 530 of FIG. 5 can be operably coupled to the second communication system 600 for purposes similar to those described above. The pre-processor 530 can perform function 562 and thereby provide emergency alert system message collision avoidance services to the CDs 601, 602, 603 and 605 of FIG. 6.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Upon reviewing the aforementioned embodiments, it would be evident to an artisan with ordinary skill in the art that said embodiments can be modified, reduced, or enhanced without departing from the scope of the claims described below. For example the message collision avoidance techniques disclosed herein can be applied to other emergency messages, not necessarily subscribing to the emergency alert system, or more generally to wide classes of other messages. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
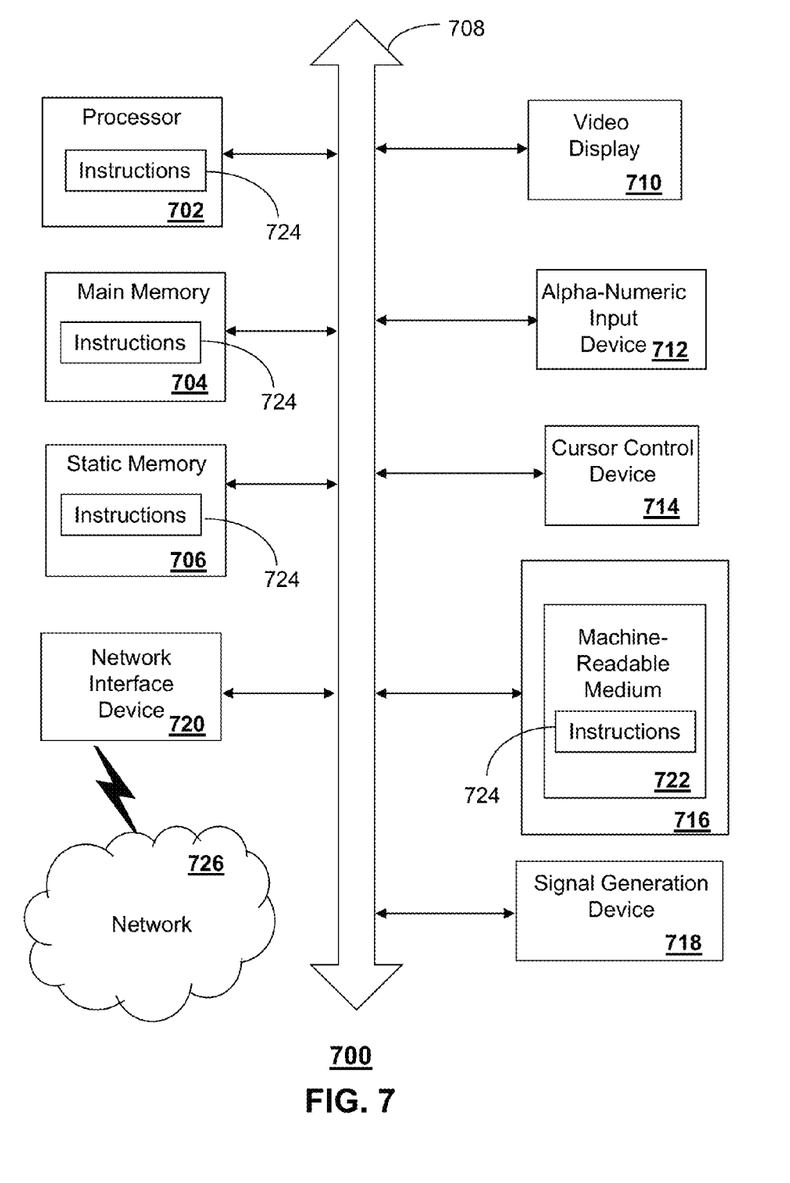
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods describe above. One or more instances of the machine can operate, for example, as the pre-processor 110 (FIG. 1), 300 (FIG. 3), the emergency access controller 118 (FIG. 1), the controller 310 (FIG. 3), the message detector 306, the audio circuit 304, the delay device 308, the aggregator 312, the pre-processor 530 (FIG. 5), and the media processor 506. In some embodiments, the machine may be connected (e.g., using a network 726) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor or other forms of instructions manifested as a state machine implemented with logic components in an application specific integrated circuit or field programmable array. Furthermore, software implementations can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations on a controllable device may perform such operations on the controllable device directly or indirectly by way of an intermediate device directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

receiving, by a system comprising a processor, a first audio input signal from a first communication source and a second audio input signal from a second communication source;

detecting, by the system, within the first audio input signal, first digitally encoded data indicative of a first emergency alert system message;

detecting, by the system, within the second audio input signal, second digitally encoded data indicative of a second emergency alert system message;

providing, by the system, information indicative of the detecting of the first and second digitally encoded data;

detecting, by the system, a temporal overlap of a portion of the first emergency alert system message of the first audio input signal and the second emergency alert system message of the second audio input signal, wherein the detecting of the temporal overlap is based on the information indicative of the detecting of the first and second digitally encoded data;

generating, by the system, a first audio output signal including the first emergency alert system message and a second audio output signal including the second emergency alert system message; and applying, by the system, in response to the detecting of the temporal overlap, a relative delay between the first audio output signal and the second audio output signal, such that the first emergency alert system message in the first audio output signal and the second emergency alert system message in the second audio output signal are non-overlapping.

2. The method of claim 1, wherein the applying of the relative delay further comprises:

storing, by the system, temporarily a first buffered portion of the first audio input signal and a second buffered portion of the second audio input signal; and analyzing, by the system, each of the first buffered portion and the second buffered portion.

3. The method of claim 2, wherein the analyzing of each of the first buffered portion and the second buffered portion comprises:

detecting the first emergency alert system message from the first buffered portion; and detecting the second emergency alert system message from the second buffered portion, wherein the first buffered portion comprises an audio phase shift keying modulated signal comprising the first emergency alert system message and the second buffered portion comprises an audio phase shift keying modulated signal comprising the second emergency alert system message.

4. The method of claim 1, further comprising determining a message priority of each of the first emergency alert system message and the second emergency alert system message, wherein the relative delay is applied in response to the message priority of each of the first emergency alert system message and second emergency alert system message.

5. The method of claim 1, wherein the relative delay provides a minimum delay between an end of the first emergency alert system message and a beginning of the second emergency alert system message.

6. The method of claim 1, further comprising forwarding the first audio output signal and the second audio output signal to an emergency alert system encoder and decoder.

7. The method of claim 1, further comprising:

determining, by the system, that the second emergency alert system message is duplicative of the first emergency alert system message;

forwarding, by the system, the first audio output signal to an emergency alert system encoder and decoder; and preventing, by the system, forwarding of the second audio output signal to the emergency alert system encoder and decoder.

8. A device comprising:

a memory to store executable instructions; and a processor coupled to the memory, wherein the processor, responsive to executing the instructions, facilitates performance of operations comprising:

receiving a first audio input signal from a first communication source and a second audio input signal from a second communication source;

detecting within the first audio input signal, first digitally encoded data indicative of a first emergency alert system message;

detecting within the second audio input signal, second digitally encoded data indicative of a second emergency alert system message;

providing information indicative of the detecting of the first and second digitally encoded data;

detecting between the first audio input signal and the second audio input signal a temporal overlap of a portion of the first emergency alert system message and the second emergency alert system message, wherein the detecting of the temporal overlap is based on the information indicative of the detecting of the first and second digitally encoded data;

generating a first audio output signal including the first emergency alert system message and a second audio output signal including the second emergency alert system message; and applying, in response to the detecting of the temporal overlap, a relative delay between the first audio output signal and the second audio output signal.

9. The device of claim 8, wherein the detecting of the first emergency alert system message from the first audio input signal and the second emergency alert system message from the second audio input signal comprises:

storing temporarily a first buffered portion of the first audio input signal and a second buffered portion of the second audio input signal; and analyzing each of the first buffered portion and the second buffered portion.

10. The device of claim 9, wherein the analyzing of each of the first buffered portion and the second buffered portion comprises:

detecting the first emergency alert system message from the first buffered portion; and detecting the second emergency alert system message from the second buffered portion, wherein the first buffered portion comprises an audio phase shift keying modulated signal comprising the first emergency alert system message and the second buffered portion comprises an audio phase shift keying modulated signal comprising the second emergency alert system message.

11. The device of claim 8, wherein the operations further comprise determining a message priority of each of the first emergency alert system message and the second emergency alert system message, wherein the relative delay is applied in response to the message priority of each of the first and second emergency alert system messages.

12. The device of claim 8, wherein the applying of the relative delay eliminates the temporal overlap between the first emergency alert system message of the first audio output signal and the second emergency alert system message of the second audio output signal.

13. The device of claim 8, wherein the operations further comprise forwarding the first audio output signal and the second audio output signal to an emergency alert system encoder and decoder.

14. The device of claim 8, wherein the operations further comprise:

determining that the second emergency alert system message is duplicative of the first emergency alert system message;

forwarding the first audio output signal to an emergency alert system encoder and decoder; and preventing forwarding of the second audio output signal to the emergency alert system encoder and decoder.

15. A non-transitory machine-readable storage medium, comprising executable instructions which, responsive to being executed by a processor, cause the processor to facilitate performance of operations comprising:

receiving a first audio input signal from a first communication source and a second audio input signal from a second communication source;

detecting, within the first audio input signal, first digitally encoded data indicative of a first emergency message;

detecting, within the second audio input signal, second digitally encoded data indicative of a second emergency message;

providing information indicative of the detecting of the first and second digitally encoded data;

detecting between the first audio input signal and the second audio input signal a temporal overlap of a portion of the first emergency message and the second emergency message, wherein the detecting of the temporal overlap is based on the information indicative of the detecting of the first and second digitally encoded data;

forwarding a first audio output signal including the first emergency message and a second audio output signal including the second emergency message to an encoder and decoder to process each of the first emergency message and the second emergency message; and applying, in response to the detecting of the temporal overlap, a relative delay between the first audio output signal and the second audio output signal to eliminate the temporal overlap between the first emergency message and the second emergency message.

16. The non-transitory machine-readable storage medium of claim 15, wherein the detecting of the first and second digitally encoded data comprises:

storing temporarily a first buffered portion of the first audio input signal and a second buffered portion of the second audio input signal, wherein the first buffered portion comprises an audio phase shift keying modulated signal comprising the first emergency message and the second buffered portion comprises an audio phase shift keying modulated signal comprising the second emergency message; and analyzing each of the first buffered portion and the second buffered portion.

17. The non-transitory machine-readable storage medium of claim 16, wherein the analyzing comprises analyzing each of the first buffered portion and the second buffered portion comprises detecting a first emergency message from the first buffered portion and a second emergency message from the second buffered portion.

18. The non-transitory machine-readable storage medium of claim 15, wherein the operations further comprise determining a message priority of each of the first emergency message and the second emergency message, wherein the relative delay is applied in response to the message priority of each of the first and second emergency messages.

19. The non-transitory machine-readable storage medium of claim 15, wherein the operations comprise forwarding the first audio output signal and the second audio output signal to an encoder and decoder.

20. The non-transitory machine-readable storage medium of claim 15, wherein the operations further comprise:

determining that the second emergency message is duplicative of the first emergency message;

forwarding the first audio output signal to an encoder and decoder; and preventing forwarding of the second audio output signal to the encoder and decoder.

\* \* \* \* \*